United States Patent
Nilsson

(10) Patent No.: US 9,502,144 B2
(45) Date of Patent: Nov. 22, 2016

(54) FILTER FOR A NUCLEAR REACTOR CONTAINMENT VENTILATION SYSTEM

(71) Applicant: Westinghouse Electric Company LLC, Cranberry Township, PA (US)

(72) Inventor: Per-Olof Nilsson, Vasteras (SE)

(73) Assignee: Westinghouse Electric Company LLC, Cranberry Township, PA (US)

( * ) Notice: Subject to any disclaimer, the term of this patent is extended or adjusted under 35 U.S.C. 154(b) by 483 days.

(21) Appl. No.: 13/792,401

(22) Filed: Mar. 11, 2013

(65) Prior Publication Data

US 2014/0010340 A1 Jan. 9, 2014

Related U.S. Application Data

(60) Provisional application No. 61/668,585, filed on Jul. 6, 2012.

(51) Int. Cl.
*G21C 19/303* (2006.01)
*G21C 19/00* (2006.01)
(Continued)

(52) U.S. Cl.
CPC ............. *G21C 19/00* (2013.01); *G21C 13/022* (2013.01); *G21C 13/10* (2013.01); *G21C 19/303* (2013.01); *G21F 9/02* (2013.01); *G21C 9/008* (2013.01); *Y02E 30/40* (2013.01)

(58) Field of Classification Search
CPC ............. F02M 25/07; F02M 25/0715; F02M 25/0747; F02M 25/0752; F02M 25/0836; F02M 35/104; F02M 35/1042; F02M 35/1045; F02M 35/1047; F02M 35/108; F02M 35/116; F02M 35/024; F02M 35/02408; F02M 35/02416; F02M 35/02425; F02M 35/02475; F02M 35/02486; F02M 35/02491; F02M 35/14; F02M 35/04; F02M 35/12; F02M 35/1205; F02M 35/1222; F02M 35/1227; F02M 35/02466; B01D 47/10; B01D 47/00; B01D 47/028; B01D 47/05; B01D 47/12; F01N 2330/48; F01N 2330/60; G21C 9/00; G21C 9/004; G21C 9/012; G21C 9/008; G21C 19/303; G21F 9/02
USPC ....... 376/283, 309, 313, 280, 310, 282, 294, 376/314; 261/126, DIG. 54; 72/468; 49/182; 20/151, 275
See application file for complete search history.

(56) References Cited

U.S. PATENT DOCUMENTS 1,515,949 A * 11/1924 Hegan .................. 55/519
2,448,491 A * 8/1948 Latham, Jr. ............ 62/643
(Continued)

FOREIGN PATENT DOCUMENTS

CA 2806390 3/2012
CN 101700450 5/2010

OTHER PUBLICATIONS

International Search Report for PCT/US2013/046215 dated Dec. 2, 2013 (Form PCT/ISA/210).
(Continued)

*Primary Examiner* — Jack W Keith
*Assistant Examiner* — Daniel Wasil
(74) *Attorney, Agent, or Firm* — Richard J. Coldren; Westinghouse Electric Company LLC

(57) ABSTRACT

A wet filter for a nuclear reactor primary containment vent that employs an inclined manifold having a plurality of outlets that communicate through a first set of metal fiber filters submerged in a pool of water enclosed within a pressure vessel. A demister suspended above the pool of water to remove any entrained moisture in the filtered effluent before being passed through a second stage of higher density, dry, metal fiber filters connected to a second manifold that communicates with an outlet on the pressure vessel that is connected to an exhaust passage to the atmosphere.

19 Claims, 2 Drawing Sheets

(51) Int. Cl.
*G21C 13/10* (2006.01)
*G21F 9/02* (2006.01)
*G21C 13/02* (2006.01)
*G21C 9/008* (2006.01)

(56) References Cited

U.S. PATENT DOCUMENTS

| | | | | |
|---|---|---|---|---|
| 4,270,938 A | * | 6/1981 | Schmidt et al. | 62/600 |
| 4,454,038 A | * | 6/1984 | Shimodaira et al. | 210/150 |
| 4,566,406 A | * | 1/1986 | Appleman | F22B 37/483 |
| | | | | 376/310 |
| 4,610,840 A | | 9/1986 | Leach | |
| 4,617,120 A | * | 10/1986 | Barzuza et al. | 210/409 |
| 4,775,471 A | * | 10/1988 | Nagai | B01D 65/02 |
| | | | | 376/313 |
| 4,797,249 A | * | 1/1989 | Schweiger | 376/279 |
| 4,873,050 A | * | 10/1989 | Eckardt | G21C 9/004 |
| | | | | 376/313 |
| 4,927,596 A | | 5/1990 | Minnick | |
| 5,017,331 A | * | 5/1991 | Eckardt | G21C 9/004 |
| | | | | 376/313 |
| 5,122,333 A | * | 6/1992 | Larsen | G21C 9/004 |
| | | | | 376/283 |
| 5,223,209 A | * | 6/1993 | Eckardt | 376/283 |
| 5,227,127 A | | 7/1993 | Sato | |
| 5,267,283 A | * | 11/1993 | Berg et al. | 376/314 |
| 5,272,733 A | * | 12/1993 | Tajima | G21C 7/16 |
| | | | | 376/313 |
| 5,293,413 A | * | 3/1994 | Eckardt | 376/314 |
| 5,872,825 A | | 2/1999 | Eckardt | |
| 6,120,583 A | * | 9/2000 | Saito et al. | 95/278 |
| 6,456,683 B1 | * | 9/2002 | Izumi | G21C 19/30 |
| | | | | 376/313 |
| 8,218,709 B2 | | 7/2012 | Eckardt | |
| 2006/0188055 A1 | * | 8/2006 | Eckardt | G21C 9/004 |
| | | | | 376/283 |
| 2007/0092053 A1 | * | 4/2007 | Sato | 376/283 |
| 2012/0121056 A1 | | 5/2012 | Sato et al. | |

OTHER PUBLICATIONS

Written Opinion of the International Searching Authority for PCT/US2013/046215 dated Dec. 2, 2013 (Form PCT/ISA/237).
International Preliminary Report on Patentability for PCT/US2013/046215 dated Jan. 15, 2015 (Forms PCT/IB/326, PCT/IB/373, PCT/ISA/237).
Westinghouse Electric Company LLC, Appl. No. 13813757.5, European Search Report, Feb. 9, 2016, 9 pages.

* cited by examiner

FILTER FOR A NUCLEAR REACTOR CONTAINMENT VENTILATION SYSTEM

CROSS REFERENCE TO RELATED APPLICATION

This application claims priority under 35 U.S.C. §119(e) to U.S. Provisional Application Ser. No. 61/668,585, filed Jul. 6, 2012, entitled "Wet Scrubber Using Fiber Filters for PWR and BWR Containment Venting."

BACKGROUND

1. Field

This invention pertains generally to nuclear reactor containment ventilation systems and more particularly to a wet filter for such systems.

2. Related Art

In many jurisdictions, nuclear power plants must be designed to ensure that even in the event of accidents, a mechanism will be provided to prevent or minimize the escape of radioactive material and noble gases. To guard against radioactive releases, the reactor system is typically housed within a primary containment structure that is constructed from steel and reinforced concrete. The primary containment vessel is designed to be capable of withstanding large pressures which may result from various accident scenarios. However, it has been postulated that in severe accidents, the containment vessel itself could fail from gradually increasing pressure. Although the likelihood of such an event is considered very small, the health risks associated with exposing the surrounding population to the radioactive releases of such an event has led many to believe that a mechanism should be provided to filter the gases and minimize the release of radioactivity, if the containment vessel is vented to reduce its pressure. That is, it is desirable to both provide a pressure release device for the containment vessel and a mechanism for filtering any gases that may be released by the containment before they are released into the atmosphere.

The nuclear accidents at Chernobyl, Ukraine in 1986 and more recently Fukushima Dai-ichi in Japan in 2011, clearly show the consequences of a release of fission products with long decay times. Large ground areas surrounding the damaged power plants were contaminated and rendered not suitable for use for several decades. The cost impact is tremendous. Short-lived fission products such as iodine in different forms, while more harmful to people, have consequences that are more easily managed. Fission products in the form of small aerosols, which are long lived, can be spread over large distances, depending on meteorological conditions. As a result of these accidents, the governments of many countries have decided that nuclear power plants must install filtered containment ventilation systems to protect people and the surrounding land from damage due to radioactive contamination.

In the past, a number of filtration systems have been proposed, such as the one described in U.S. Pat. No. 4,610,840, issued to Leach and assigned to the Assignee of this invention. Leach discloses a fission product scrubbing system for a nuclear reactor. Specifically, a second compartment in fluid communication with the containment is partially filled with water. In the event of a large pressure increase, a ruptured disc disposed within a vent pipe emanating from the secondary compartment bursts to relieve pressure. When the rupture disc blows, radioactive gases and vapors from the containment pass through the water filled secondary compartment and are then released through the now open vent pipe. As the hot containment gases and vapors pass through the water stored within the enclosed secondary compartment, a large portion of the fission products will be scrubbed from the containment gases. While such a system can be effective, there is still room for improvement for reducing the size and increasing the effectiveness of such a system to minimize any exposure that such a release may potentially cause.

Accordingly, it is an object of this invention to provide a more effective filter that will minimize, if not completely remove any radioactive effluent that may be entrained in any release of gases from a nuclear primary containment.

It is a further object of this invention to provide such a filtration system that can be supported within a nuclear primary containment or the existing or new buildings near the primary containment without taking up substantial space.

SUMMARY

These and other objectives are achieved by a nuclear power generating facility having a primary containment for housing a nuclear reactor. The containment confines a substantial portion of any radiation leaked from the nuclear reactor. The primary containment has a ventilation outlet for providing a controlled release for an atmospheric pressure buildup within the containment in the event the pressure of an atmospheric effluent within the containment is built up to a level that threatened to compromise its integrity. A filter is connected to the ventilation outlet and includes a vessel having an input nozzle connected to the ventilation outlet and an inlet conduit in fluid communication with the inlet nozzle, that extends into a lower portion of an interior of the filter vessel. A manifold is connected to the inlet conduit and extends into the lower portion of the vessel. The manifold includes a plurality of outlets designed to release a portion of a primary containment atmospheric effluent under a pool of liquid contained within the filter vessel. At the outlets of the manifold, fiber filters are attached. The effluent from the primary containment, which is distributed by the manifold, are passed through the fiber filters. A vessel outlet is also provided in fluid communication with the interior of the vessel and is operable to exhaust the filtered containment atmospheric effluent to an outside atmosphere exterior of the containment. In one embodiment, the manifold and the fiber filters are covered with a liquid such as water which may have sodiumthiosulphate dissolved within the liquid.

In a second embodiment, the filter includes a demister supported within the vessel above the pool of liquid for separating out any moisture from an exhaust fraction of the filtered containment atmospheric effluent. Optionally, a second set of a plurality of fiber filters extends from a second manifold which is connected to the vessel outlet with the fiber filters preferably supported above the demister. In this embodiment, the second set of fiber filters has a greater density of fibers than the first set of fiber filters and desirably both sets of filters comprise metal fibers. Preferably, the vessel interior is maintained at a pressure above atmospheric pressure and is inerted with nitrogen during standby conditions.

In still another embodiment, the manifold extends into the lower portion of the vessel at an acute angle to a central axis of the vessel and preferably is configured as an inverted "V" having a downward leg extending from each side of an apex with the outlets extending from at least one of the legs. In this configuration, the inlet conduit is preferably coupled to the manifold at the apex and each of the downward extending legs has the outlets extending therefrom. Desirably, the outlets extend upwardly from the extending legs.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
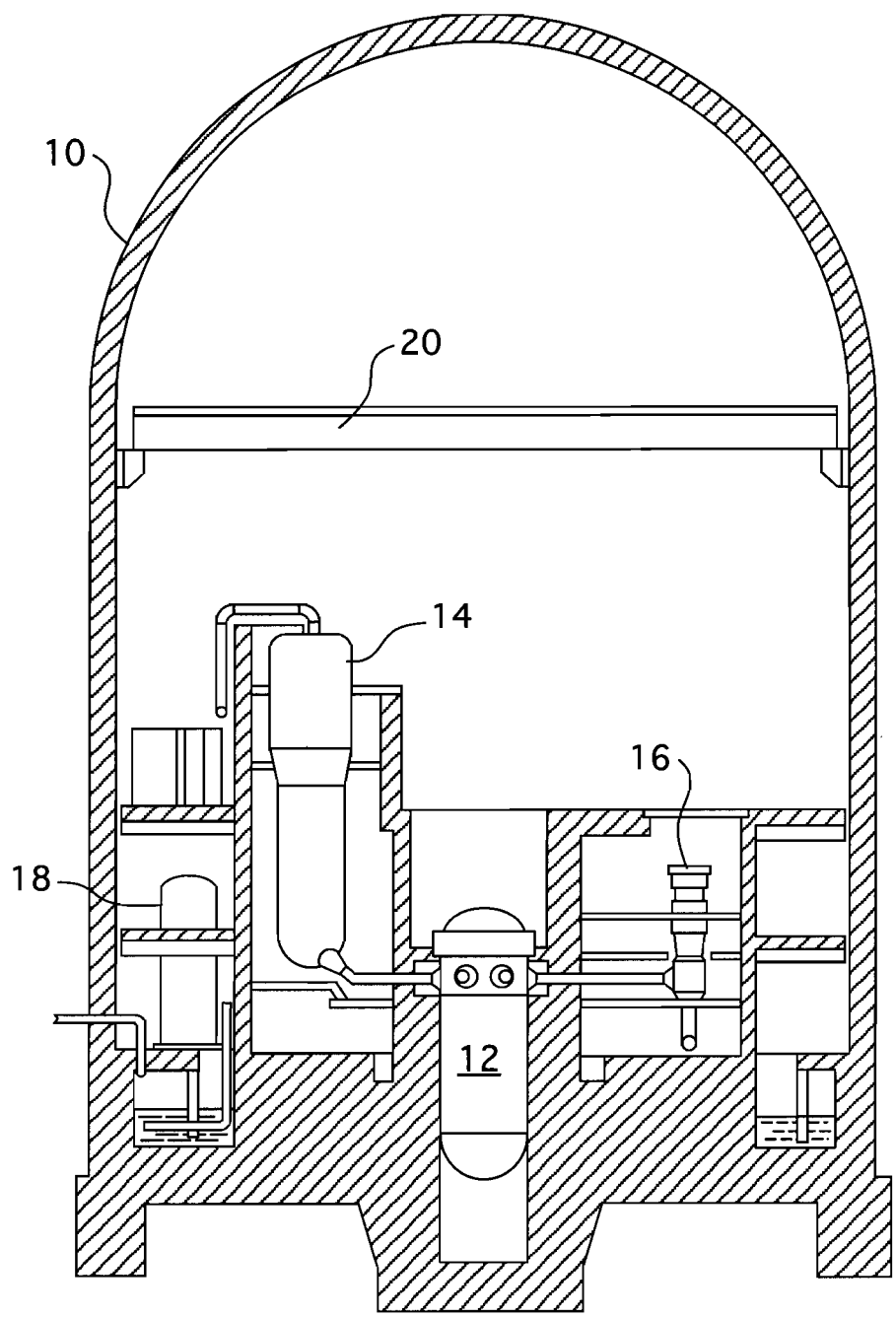
FIG. 1 is a schematic sectional elevation of a containment building with principal components of a pressurized water reactor shown, to which this invention may be applied.

Referring to FIG. 1, there is schematically illustrated a pressurized water reactor nuclear power generating system including a containment building 10 (generally having a relatively thick outside concrete layer over a steel liner) which houses components of the nuclear reactor system, such as a reactor vessel 12, a steam generator 14, a reactor coolant pump 16, an accumulator tank 18 and overhead polar crane 20. Since all of these components and their relationships are well known and further, since they do not specifically cooperate, structurally or functionally, with the invention, they are not described or illustrated in greater detail. While the preferred embodiment of the invention is described in connection with a pressurized water reactor, it is to be understood that the system, in accordance with the invention as claimed hereafter, is equally applicable to nuclear reactors of any other design, such as, for example, a boiling water reactor or a gas reactor.

A filter unit, in a nuclear primary containment application, has the task to separate radioactive matter from the gas released during a depressurization of the containment to significantly reduce the emission of radioactivity, in case of a severe accident. The filter of this invention is connected to either an already installed venting system or during a new installation of such a system. The filter is positioned after the isolation valves and/or rupture disc, close to the containment and before the rupture disc leading to the plant exhaust. In a standby condition, the filter is preferably inerted with nitrogen to prevent hydrogen combustion and degradation of the filter water and tank internals.

Figure 2:
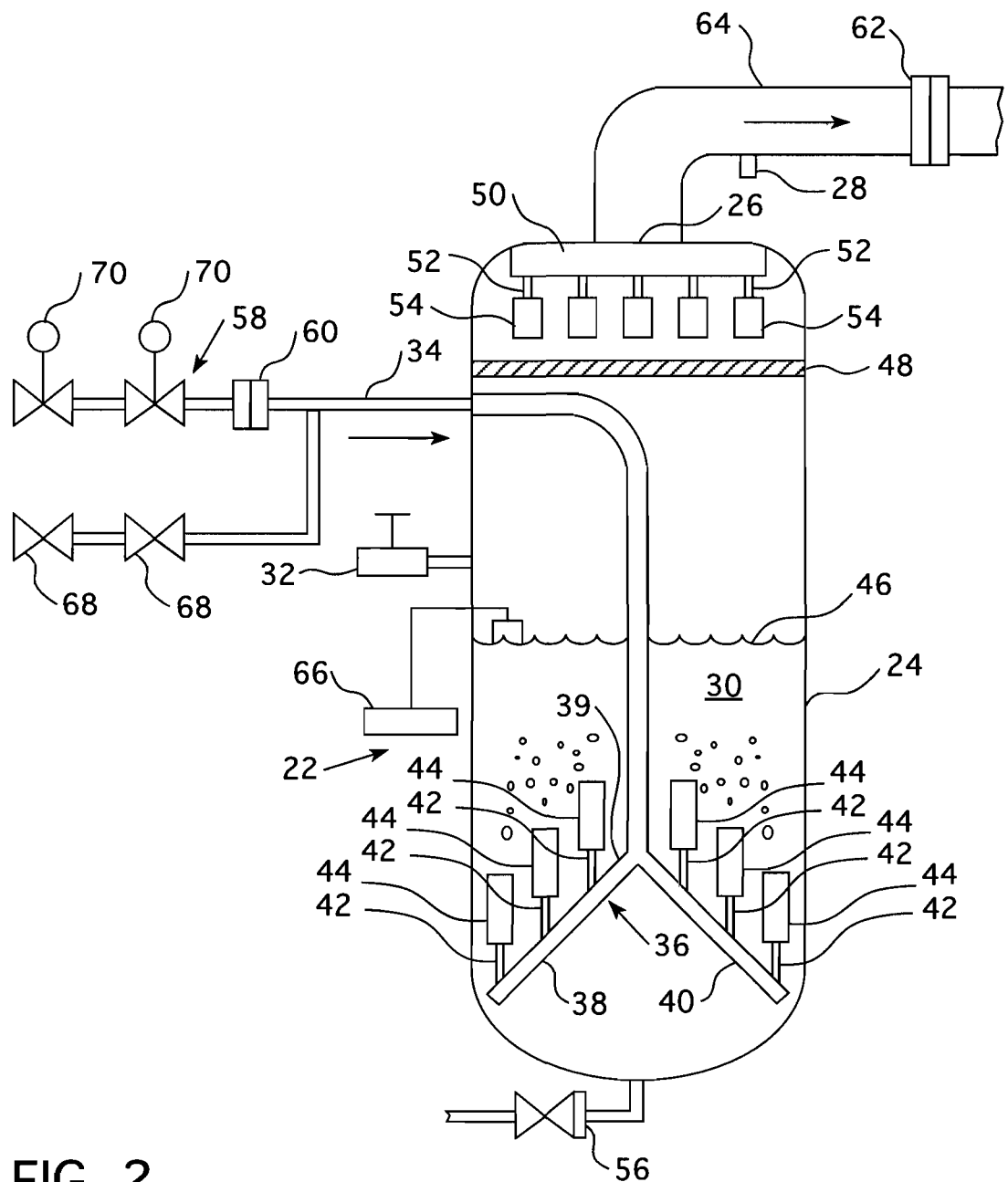
FIG. 2 is a schematic of one embodiment of this invention.

One embodiment of the filter unit incorporating the principles of this invention is illustrated in FIG. 2. The major portions of the wet filter system 22 is housed in a tank or pressure vessel 24 that may be pressurized to reduce its size. Pressurization is accomplished through an orifice 28 located directly downstream of the filter tank outlet 26. A lower portion of the tank 24 is filled with water 30 through a water inlet 32. The water 30 has two functions; to remove decay heat from the captured fission products and to improve filter efficiency. Chemicals such as sodiumthiosulphate can be added to the water 30 so that iodine in gaseous and aerosol form can be captured and contained.

Ventilated gas from the interior of the containment is led into a central inlet pipe 34 that leads the ventilated gas into a manifold 36 in the lower portion of the tank 24. The lower manifold 36 has two downwardly extending legs 38 and 40 that extend down at an acute angle from an apex 39 to form an inverted "V". Each of the legs 38 and 40 have a plurality of the manifold outlets 42 that extend in an upwardly direction into the pool of water 30. A cartridge of metal fiber filters 44 extends from and is in fluid communication with each of the plurality of the manifold outlets 42. The cartridge of metal fiber filters 44 have two functions; to filter aerosols and to atomize the ventilated gas into small bubbles so that the gas can be more efficiently scrubbed in the water pool 30. While metal fiber and preferably sintered metal fiber filters are preferable, other filter media may also be used without departing from the principles of this invention. Captured fission products in the cartridge of metal fiber filters 44 will generate decay heat but cannot generate temperatures high enough to be damaged since they are positioned in the filter water. Aerosols will be distributed over the metal fiber filter area of each cartridge so there is no risk that the filters will clog. The manifold legs 38 and 40 are sloped so that a number of cartridges corresponding to the dynamic pressure loss due to volume flow will be in use. In this way, the system can be used in a wide flow range and even at very low flow and containment pressure. The total pressure loss in the wet filter system 22 will be equal to the water level 46 in the tank 24 and since this is relatively low, the filter system will allow early venting of the primary containment, when the pressure is low, keeping the primary containment pressure very low has advantages in some accident scenarios.

A demister 48 is supported in the upper portion of the tank 24 below the outlet 26. The demister removes water droplets that can be entrained by the steam that leaves the filter tank. Preferably, the wet filter system 22 also includes a secondary filter to remove smaller aerosols which could not be filtered by the metal fiber filters submerged in the water and by the water itself. The secondary filter includes a second, upper manifold 50 just below and in fluid communication with the tank outlet 26. The secondary manifold includes a plurality of preferably downwardly extending inlets 52 which are connected to and in fluid communication with a secondary set of metal fiber filters 54, one for each inlet 52, supported above the demister 48. The secondary metal fiber filter cartridges 54 are typically also made from the same kind of cartridges as the cartridges of metal fiber filters 44, but with a finer and more densely packed mesh to capture the smaller aerosols. Since the second set of filters will experience very small quantities of aerosols, they will not overheat. A drain 56 is provided in the bottom of the tank 24 for maintenance purposes. The water inlet 32 and drain 56 are also used for sampling the water both in standby and after activation. Preferably, the filter tank 24 is installed behind a radiation shield and a shielded control panel is placed close to the tank. Preferably, the tank is located within a structure downstream of the isolation valves 58 and rupture discs 60 in the vent system outlet. Desirably, if passive activation is required valves 68 are required and valves 70 and rupture discs 60 are optional. A second rupture disc 62 may be positioned in the tank outlet pipe 64 which leads to an outlet to the atmosphere. The rupture disc 62 facilitates inerting the tank 24 with nitrogen and preferably has a low rupture pressure, e.g., approximately 1.3 bar(a).

The wet filter system 22 needs no external power and can be designed for completely passive use during at least 24 hours. Water may be added after some time. A water level alarm and measurement system, figuratively shown by reference character 66, is used to ensure that the water level is never too low. The wet filter system 22 can be configured to handle both dry well and wet well venting for boiling water reactors and containment venting for pressurized water reactors.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear power generating facility having a containment for housing a nuclear reactor for confining radiation leaked from the nuclear reactor, the containment having a ventilation outlet for providing a controlled release for an atmospheric pressure buildup within the containment in event the pressure of an atmospheric effluent within the containment is built up to a level that exceeded a preselected value, including a filter comprising:
   a filter vessel having an input nozzle connected to the ventilation outlet;
   a liquid occupying a portion of a lower interior of the filter vessel and configured to function as a scrubber for the atmospheric effluent;
   an inlet conduit in fluid communication with the inlet nozzle and extending into the lower interior of the filter vessel;
   a manifold connected to the inlet conduit and extending into the lower portion of the filter vessel, the manifold including a plurality of outlets and designed to operate with the outlets respectively releasing a portion of the containment atmospheric effluent under a pool of the liquid contained within the filter vessel;
   a first set of a plurality of fiber filters, each fiber filter being submerged in the liquid and having substantially a first density of fibers for filtering the atmospheric effluent exhausted through the corresponding outlet in the manifold with each of the fiber filters in the first set connected to and in fluid communication with one of the manifold outlets and configured, in a steady state operation of the filter, so that the containment atmospheric effluent passes through at least a portion of the fibers before the containment atmospheric effluent contacts the liquid; and
   a filter vessel outlet in fluid communication with the interior of the filter vessel and operable to exhaust the filtered containment atmospheric effluent to an outside atmosphere exterior of the containment.

2. The nuclear power generating facility of claim 1 wherein the filter vessel is inerted with nitrogen.

3. The nuclear power generating facility of claim 1 wherein said liquid comprises water.

4. The nuclear power generating facility of claim 1 including sodiumthiosulphate dissolved within the liquid.

5. The nuclear power generating facility of claim 1 including a demister supported above the pool of liquid for separating out any moisture from an exhaust fraction of the filtered containment atmospheric effluent.

6. The nuclear power generating facility of claim 1 including a second set of a plurality of fiber filters extending from a second manifold which is connected to the filter vessel outlet.

7. The nuclear power generating facility of claim 6 wherein the second set of the plurality of fiber filters has a greater density of fibers than the first set of fiber filters.

8. The nuclear power generating facility of claim 7 wherein the second set of fiber filters comprise metal fibers.

9. The nuclear power generating facility of claim 1 wherein the first set of fiber filters comprise metal fibers.

10. The nuclear power generating facility of claim 1 wherein the filter vessel is a pressure vessel including apparatus for maintaining the filter vessel interior at a pressure above atmospheric pressure.

11. The nuclear power generating facility of claim 1 wherein the manifold extends into the lower portion of the filter vessel at an acute angle to a central axis of the filter vessel.

12. The nuclear power generating facility of claim 11 wherein the manifold extends into the lower interior of the filter vessel, configured as an inverted "V" having a downward leg extending from each side of an apex with the outlets extending from at least one of the legs.

13. The nuclear power generating facility of claim 12 wherein the inlet conduit is coupled to the manifold at the apex.

14. The nuclear power generating facility of claim 2 wherein each of the downward extending legs has the outlets extending therefrom.

15. The nuclear power generating facility of claim 12 wherein the outlets extend upwardly from the extending legs.

16. A filter for filtering an effluent, comprising:
   a vessel having an input nozzle;
   a liquid occupying a portion of a lower interior of the vessel and configured to function as a scrubber for the effluent;
   an inlet conduit in fluid communication with the inlet nozzle and extending into the lower interior of the vessel;
   a manifold connected to the inlet conduit and extending into the lower portion of the vessel; the manifold including a plurality of outlets and designed to operate with the outlets respectively releasing a portion of an effluent to be filtered, under a pool of the liquid contained within the vessel;
   a first set of a plurality of fiber filters, each fiber filter being submerged in the liquid and having substantially a first density of fibers for filtering the effluent exhausted through the corresponding outlet in the manifold with each of the fiber filters in the first set connected to and in fluid communication with one of the manifold outlets and configured, in a steady state operation of the filter, so that the effluent passes through at least a portion of the fibers before the effluent contacts the liquid; and
   a vessel outlet in fluid communication with the interior of the vessel and operable to exhaust the filtered effluent to an outside atmosphere.

17. The filter of claim 16 including a demister supported above the pool of liquid for separating out any moisture from an exhaust fraction of the filtered effluent.

18. The filter of claim 16 wherein the manifold extends into the lower interior of the vessel at an acute angle to a central axis of the vessel and the manifold is configured as an inverted "V" having a downward leg extending from each side of an apex with the outlets extending from at least one of the legs.

19. The filter of claim 16 including a second set of a plurality of fiber filters extending from a second manifold which is connected to the vessel outlet wherein the second set of the plurality of fiber filters has a greater density of fibers than the first set of fiber filters.

* * * * *